US012296482B2

(12) United States Patent
Jamal et al.

(10) Patent No.: US 12,296,482 B2
(45) Date of Patent: May 13, 2025

(54) SYSTEM FOR CONTROLLING ROBOT FINGER AND METHOD FOR THE SAME

(71) Applicants: HYUNDAI MOTOR COMPANY, Seoul (KR); Kia Corporation, Seoul (KR)

(72) Inventors: Muhammad Zahak Jamal, Yongin-si (KR); Dong Jin Hyun, Suwon-si (KR); Dong Hyun Lee, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 860 days.

(21) Appl. No.: 17/475,771

(22) Filed: Sep. 15, 2021

(65) Prior Publication Data

US 2022/0088777 A1 Mar. 24, 2022

(30) Foreign Application Priority Data

Sep. 21, 2020 (KR) .................. 10-2020-0121746

(51) Int. Cl.
*B25J 9/16* (2006.01)
*B25J 15/10* (2006.01)

(52) U.S. Cl.
CPC ............ *B25J 9/163* (2013.01); *B25J 9/1607* (2013.01); *B25J 9/1612* (2013.01); *B25J 15/10* (2013.01); *B25J 9/161* (2013.01)

(58) Field of Classification Search
CPC ........ B25J 9/163; B25J 9/1607; B25J 9/1612; B25J 15/10; B25J 9/161; B25J 13/00;
(Continued)

(56) References Cited

U.S. PATENT DOCUMENTS 9,870,449 B2 1/2018 Rajan et al.
2007/0167859 A1* 7/2007 Finneran ............... A61B 5/296
600/546

(Continued)

FOREIGN PATENT DOCUMENTS

JP 2014-050590 A 3/2014
JP 2016-157430 A 9/2016
(Continued)

OTHER PUBLICATIONS

Estimating Simultaneous and Proportional Finger Force Intention Based on sEMG Using a Constrained Autoencoder (Year: 2020).*
(Continued)

*Primary Examiner* — Adam R Mott
*Assistant Examiner* — Sagar Kc
(74) *Attorney, Agent, or Firm* — MORGAN, LEWIS & BOCKIUS LLP

(57) ABSTRACT

A system and a method for controlling a robot finger may include a processor to determine a mapping function using a kernel matrix means of a multichannel electromyographic (EMG) signal to train a learning algorithm using at least one EMG signal training sample), and a storage to store data and an algorithm driven by the processor. The processor determines a kernel matrix by applying a polynomial function of the second order to the multichannel EMG signal time sample, and performs an operation for the kernel matrix and the mapping function to output a signal for controlling the robot finger.

16 Claims, 16 Drawing Sheets

<901>

<802>

<803>

<804>

<805>

(58) Field of Classification Search
CPC ...... B25J 15/0009; B25J 9/1653; B25J 19/02; B25J 9/16; A61B 5/296
See application file for complete search history.

(56) References Cited

U.S. PATENT DOCUMENTS

| | | | | |
|---|---|---|---|---|
| 2012/0116256 | A1* | 5/2012 | Stavdahl | A61F 2/72 600/595 |
| 2014/0128992 | A1* | 5/2014 | Engeberg | A61F 2/72 623/25 |
| 2016/0246931 | A1 | 8/2016 | Rajan et al. | |
| 2018/0140441 | A1* | 5/2018 | Poirters | A61F 2/72 |
| 2020/0054466 | A1* | 2/2020 | Gill | B25J 15/0009 |
| 2021/0315509 | A1* | 10/2021 | Farina | A61B 5/395 |

FOREIGN PATENT DOCUMENTS

| | | |
|---|---|---|
| KR | 10-2009-0030402 A | 3/2009 |
| KR | 10-2016-0075150 A | 6/2016 |
| KR | 10-2019-0083998 A | 7/2019 |
| WO | 2020-039206 A1 | 2/2020 |

OTHER PUBLICATIONS

Principal Component Analysis Applied to Surface Electromyography: A Comprehensive Review (Year: 2016).*
Quan Wang, "Kernel Principal Component Analysis and its Applications in Face Recognition and Active Shape Models," arXiv:1207.3538 (2012).
Daniel D. Lee et al., "Algorithms for Non-negative Matrix Factorization," Advances in Neural Information Processing Systems, 2001.
Ning Jiang et al., "Extracting Simultaneous and Proportional Neural Control Information for Multiple-DOF Prostheses From the Surface Electromyographic Signal," IEEE Transactions on Biomedical Engineering Vo. 56, No. 4, Apr. 2009, pp. 1070-1080.
Pyungkang Kim et al., "Modified Nonnegative Matrix Factorization Using the Hadamard Product to Estimate Real-Time Continuous Finger-Motion Intentions," IEEE Transactions on Human-Machine Systems, vol. 47, No. 6, Dec. 2017, pp. 1089-1099.
Office Action issued in corresponding Korean Patent Application No. 10-2020-0121746 dated Mar. 25, 2025, with English translation.

* cited by examiner

SYSTEM FOR CONTROLLING ROBOT FINGER AND METHOD FOR THE SAME

CROSS-REFERENCE TO RELATED APPLICATION

The present application claims priority to Korean Patent Application No. 10-2020-0121746, filed on Sep. 21, 2020, the entire contents of which is incorporated herein for all purposes by this reference.

BACKGROUND OF THE INVENTION

Field of the Invention

The present invention relates to a system for controlling a robot finger and a method for the same. More specifically, the present invention relates to a technology of operating a robot finger by exactly estimating a user intention to move the robot finger.

Description of Related Art

Recently, studies and research have been performed with respect to a robot hand having a plurality of finger mechanisms by copying the hand of a human being.

The robot hand includes a palm, thumb mechanism, an index finger mechanism, a middle finger mechanism, a ring finger mechanism, and a pinky mechanism corresponding to the human hand.

Accordingly, it is important to exactly detect an intention of a user, that is, a finger that the user wants to move, based on the Electromyography (EMG) signal from an EMG electrode attached to each finger, and to move a finger coordinated with the intention of the user.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system for controlling a robot finger, configured for determining a mapping function using a kernel matrix through an unsupervised learning algorithm, and detecting a user intention to move a finger when controlling the robot finger.

Various aspects of the present invention provide a system for controlling a robot hand a method for the same by introducing an unsupervised algorithm which does not require output sensors to develop correlations with the input EMG signal to estimate the movement of individual fingers of the human being. This may validate the method for its application to an upper limb amputee who may not be able to interact with interact with external as he/she is deprived of his or her fingers.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains.

According to various exemplary embodiments of the present invention, the system includes a multichannel EMG signal acquisition device for EMG signal output using EMG electrodes. The Signal acquisition system may include at least two channels of EMG to measure a voltage signal from muscle activations from the body of a user, an amplifier to amplify the EMG signal received from the EMG electrodes, a filter to filter the amplified EMG signal, and a gain device to provide a gain to the filtered signal Various aspects of the present invention provide a system for controlling a robot finger may include a processor that applies a kernel matrix with a multichannel EMG signal input (at least two channels) to evaluate mapping functions through a learning algorithm using multichannel EMG signal time samples, and a storage device to store data. The processor evaluates a kernel matrix through the application of a polynomial function to the multichannel EMG signal and perform the operation of evaluating the mapping function evaluated using a semi unsupervised learning algorithm to output a signal for controlling the robot finger.

According to various exemplary embodiments of the present invention, the semi-unsupervised algorithm may use a principle component analysis (PCA) algorithm, a non-negative matrix factorization (NMF) algorithm, or NMF with hadamard product (NMF-HP) algorithm.

According to various exemplary embodiments of the present invention, the processor determines the kernel matrix value by use of a quadratic polynomial function using a multichannel EMG signal including at least two channels.

Embodiments of the present invention present methods using the aforementioned kernel matrix with the PCA algorithm, NMF algorithm, and NMF-HP algorithms which are named as kPCA (kernel PCA), kNMF (kernel NMF), and kNMF-HP (kernel NMF-HP) in various exemplary embodiments of the present invention.

According to various exemplary embodiments of the present invention in the application of kPCA, the processor may determine a covariance matrix of kernel matrix value.

According to an exemplary embodiment in the application of kPCA, the processor determines the eigenvector matrix of the covariance matrix.

According to an exemplary embodiment in the application of kPCA, the processor evaluates the mapping function from the eigenvector matrix.

According to an exemplary embodiment in the application of kPCA, the processor determines the kernel matrix, multiplies the mapping function with the kernel matrix value, and determines a sum of a multiplied value to output the signal for controlling a robot finger, when a multichannel EMG signal of at least two channels is input.

Various exemplary embodiments of the present invention suggest the evaluation of mapping functions for each finger of the human hand by the processor.

According to according to various exemplary embodiments of the present invention in the application of kNMF, the processor performs matrix factorization to evaluate factorized matrices after determining the kernel matrix value.

According to an exemplary embodiment in the application of kNMF, the mapping function may be determined by applying a multiplicative update formula for matrix factorization.

According to various aspects of the present invention, a method for controlling a robot finger may include determining a kernel matrix by applying a quadratic polynomial function to a multichannel EMG signal (at least two channels), determining and storing a mapping function (evaluated by applying a learning algorithm on a multichannel EMG training dataset) after applying a kernel matrix on a multichannel EMG signal (at least two channels), and performing an operation for the kernel matrix value and the mapping function to output a signal for controlling the robot finger.

According to various aspects of the present invention, the learning algorithm may include a principle component analysis (PCA) algorithm, a non-negative matrix factorization (NMF) algorithm, or a NMF with hadamard product (NMF-HP) algorithm.

According to various exemplary embodiments of the present invention, the determining and storing of the mapping function may include determining the kernel matrix by determining individual terms of a second order polynomial function using a multichannel EMG signal of least two channels. According to an exemplary embodiment in the application of kPCA, the determining and storing of the mapping function may further include determining the covariance matrix of kernel matrix value.

According to various exemplary embodiments of the present invention, the determining and storing of the mapping function may further include determining the eigenvector of the covariance matrix.

According to an exemplary embodiment in the application of kPCA, the determining and storing of the mapping function further includes determining the mapping function by use of the eigenvector.

According to an exemplary embodiment in the application of kPCA, the final signal output may include multiplying the mapping function by the kernel matrix value, and determining a sum of a multiplied value to output the signal for controlling the robot finger.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
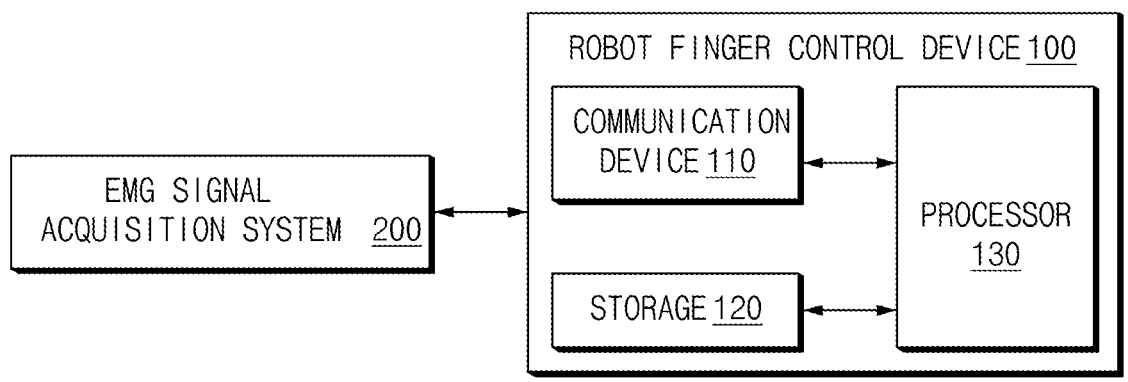
FIG. 1 is a block diagram illustrating the configuration of a system including a system for controlling a robot finger, according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

Furthermore, in the following description of components according to various exemplary embodiments of the present invention, the terms 'first', 'second', 'A', 'B', '(a)', and '(b)' may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

According to various exemplary embodiments of the present invention, an algorithm based on a semi-unsupervised scheme is employed to estimate the intention of a user to control a robot hand by use of an EMG signal. The technology employs the EMG signal to capture important information on muscle contraction when a muscle generates force. Such a characteristic of the EMG signal helps to estimate the natural intention of a human body.

According to various exemplary embodiments of the present invention, the multilayer neural network of the human body for the control of movement of human fingers may be mimicked to control the robot finger, as a kernel matrix may be employed to improve the performance of the semi-unsupervised algorithm such that the multilayer structure of the algorithm mimics the multilayer neural structure of a human body.

The semi-unsupervised algorithm employs a kernel matrix to find the mapping function of each finger through a divide and rule scheme, and to copy the multilayer structure of a human body. The kernel scheme is most generally applied to improve the performance of dimensionality reduction of unsupervised algorithms by introducing a high dimensional feature space. The kernel scheme includes nonlinear mapping for a unique data set through a kernel function. Such higher-dimensional mapping by the kernel techniques allows the semi unsupervised algorithm to separate complex spatial structures of the EMG training dataset which are not possible in the lower dimensional space.

The most advantageous point of the semi-unsupervised algorithm is the ability to find mapping functions for each finger without an output value e.g., force sensor or load cell reading etc. Accordingly, an upper limb amputated) patient unable to access external force sensors using his or her hand scan show the intention of moving his or her fingers using inherent forearm muscles such that a muscle operating pattern based on the EMG signal is obtained to move the robot finger.

Hereinafter, embodiments of the present invention will be described with reference to FIGS. 1 to 10.

Figure 2:
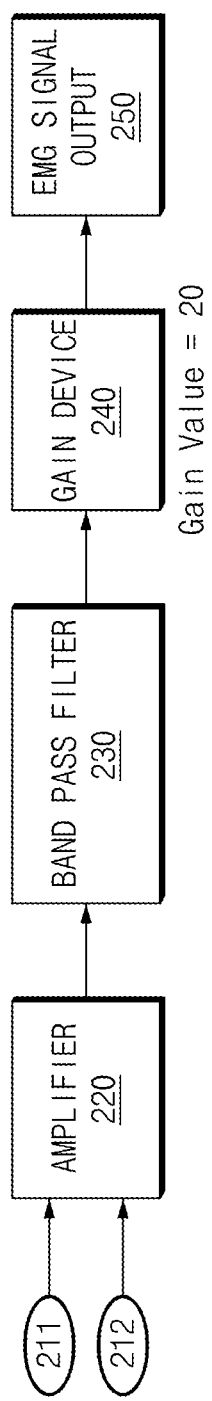
FIG. 2 is a detailed block diagram of an Electromyography signal acquisition system, according to various exemplary embodiments of the present invention.

FIG. 1 is a block diagram illustrating the configuration of a system for controlling a robot finger, according to various exemplary embodiments of the present invention, and FIG. 2 is a detailed block diagram of an Electromyography (EMG) signal acquisition device, according to various exemplary embodiments of the present invention.

According to various exemplary embodiments of the present invention, an intention of a user to move a finger is estimated through a semi-unsupervised algorithm, which is a machine learning algorithm, using EMG sensors to recognize muscle contractions when a they generate force, moving the robot finger desired by the user while transmitting a simultaneous and proportional control (SPC) commands to the robot hand.

In various exemplary embodiments of the present invention, the learning algorithm include multi-layer algorithms of Principle Component Analysis (PCA) algorithm, a Non Negative Matrix Factorization (NMF) algorithm, or a NMF with Hadamard Product (NMF-HP) algorithm.

Referring to FIG. 1, according to various exemplary embodiments of the present invention, the system for controlling the robot finger may include a device (robot finger control device) 100 for controlling the robot finger and a Signal acquisition system 200. The robot finger control device 100 and the EMG signal acquisition system 200 may be integrally formed with internal control units of a robot, or implemented separately from the internal control units of the robot as external control units of the robot through a separate connector.

The robot finger control device 100 performs a control operation to detect a user intention to move a finger, to convert a signal, which is a manifestation of neuro physiological process originating from the user when his or her brain produces a control command indicating an intention to move the finger. This control command travels as an efferent signal down the spinal cord to activate corresponding muscle fibers which thereby activate an individual finger.

In the instant case, to detect the user intention to move the finger, the robot finger control device 100 implements a kernel layer by use of an electrode signal measured by an EMG sensor may determine and store a mapping function based on a learning algorithm such as a PCA, NMF, or NMF-HP, and may perform a control operation to correctly detect the user's intention to move the finger by applying the mapping function when the EMG signal is input such that the relevant finger of the robot is moved, as illustrated in FIG. 2.

The robot finger control device 100 may include a communication device 110, a storage 120, and a processor 130.

The communication device 110, which is a hardware device implemented with various electronic circuits to transmit or receive a signal through wireless or wired connection, may make communication with the Signal acquisition system 200 according to various exemplary embodiments of the present invention.

For example, the communication device 110 may receive an EMG electrode signal from the EMG signal acquisition system 200.

The storage 120 may store data and/or algorithms required for the processor 130 to operate For example, the storage 150 may store a multi-layer algorithm of a principle component analysis (PCA) algorithm, a non-negative matrix factorization (NMF) algorithm, or an NMF with hadamard product (NMF-HP) algorithm.

The storage 120 may include at least one storage medium of a memory in a flash memory type, a hard disk type, a micro type, and the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The processor 130 may be electrically connected to the communication device 110 and the storage 120, may electrically control components of the communication device 110 and the storage 120, may be an electric circuit to perform a software command, and may process and determine various types of data to be described below.

The processor 130 may process a signal transmitted between components of the robot finger control device 100.

The processor 130 may determine a kernel matrix-based mapping function, as the learning algorithm is applied to at least one EMG training set, may determine a kernel matrix value by applying a polynomial function to multichannel EMG signal, and may perform an operation for the kernel matrix value and the mapping function to output a signal for controlling the robot finger.

In the instant case, the polynomial function is a quadratic polynomial function, and the processor 130 determines the individual terms of the quadratic polynomial function using eight EMG channels (A, B, C, D, E, F, G, or H) which gives us the resulting kernel matrix. A manner for determining the kernel matric value will be described in more detail later with reference to FIG. 6A.

The processor 130 determines the covariance matrix of the kernel matrix value, based on a PCA algorithm, determines the eigenvectors of the covariance matrix, and evaluates the mapping function using the eigenvector. A manner of determining the mapping function based on the PCA algorithm will be described in more detail later with reference to FIG. 6A.

When a multichannel EMG signal (e.g., eight channels) is input, the processor 130 determines the kernel matrix value to increase the feature space from eight channels or dimensions of EMG to 36 dimensions, multiplies it with a mapping function evaluated through training and determines the sum of the multiplied value, outputting the signal for controlling the robot finger.

The processor 130 determines the mapping function for each finger. In other words, the processor 130 may sequentially determine mapping functions for a thumb, an index finger, a middle finger, a ring finger, and a pinky, and may store the mapping functions in the storage 120.

The processor 130 may determine a kernel matrix value based on an NMF algorithm, carry out matrix factorization, and determine a mapping function by applying a multiplication update formula for matrix factorization. The manner of determining the mapping function based on the NMF algorithm will be described in more detail later with reference to FIG. 6C.

The EMG signal acquisition system 200 detects an EMG signal by electrodes attached to the arm of the user, and provides the EMG signal to the robot finger control device 100.

Referring to FIG. 2, the EMG signal acquisition system 200 includes at least two electrode electrodes 211 and 212 attached to a physical body of a user, an amplifier 220, a band pass filter 230, a gain device 240, and an EMG signal outputting device 250.

The amplifier 220 may amplify a signal received from the EMG electrodes 211 and 212. For example, a gain of the amplifier 220 may be set to 100.

The band pass filter 230 may filter a signal amplified by the amplifier 220, and may, for example, output a signal having a bandwidth of 20 Hz to 450 Hz.

The gain device 240 may provide a gain to the signal output to the band pass filter 230, and for example, the gain may be set to 20

The EMG signal outputting device 250 may provide a signal, which is output through the gain device 240, as an EMG signal to the robot finger control device 100.

Figure 3:
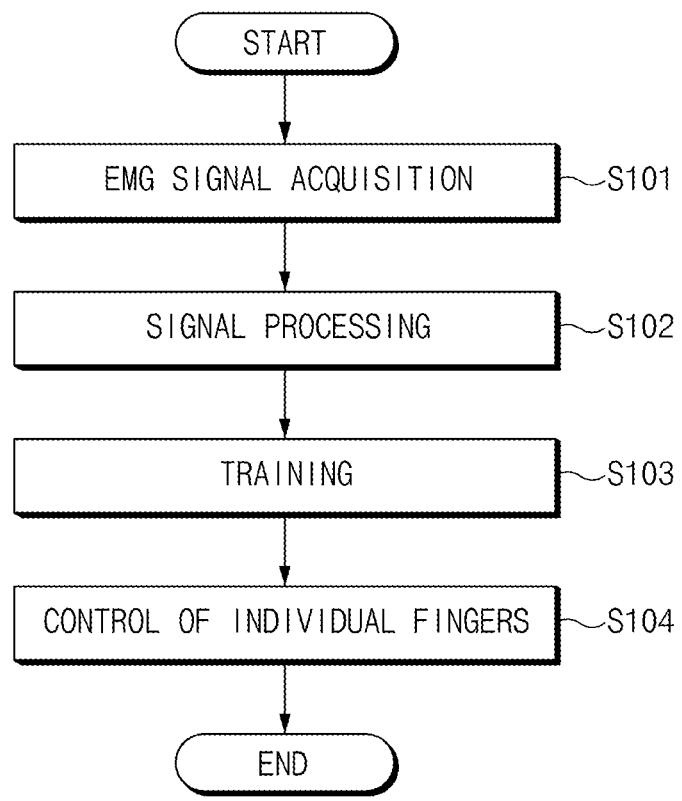
FIG. 3 is a flowchart illustrating a method for controlling a robot finger, according to various exemplary embodiments of the present invention.

Hereinafter, a method for controlling a robot finger will be described in detail with reference to FIG. 3. FIG. 3 is a flowchart illustrating the method for controlling the robot finger, according to various exemplary embodiments of the present invention.

Hereinafter, it is assumed that the robot finger control device 100 of FIG. 1 performs the process of FIG. 3. Furthermore, in the following description made with reference to FIG. 3, it may be understood that the operation referred to as being performed by the robot finger control device 100 is controlled by the processor 130 of the robot finger control device 100.

Referring to FIG. 3, the robot finger control device 100 receives an electrode signal from the EMG signal acquisition system 200 (S101).

The robot finger control device 100 performs signal processing of the received EMG electrode signal (S102).

The robot finger control device 100 trains the processed signal through the unsupervised algorithm (S103).

The robot finger control device 100 performs individual finger control as a result of performing the training (S104). In the instant case, individual finger control may be performed as simultaneous and proportional control (SPC).

Figure 4:
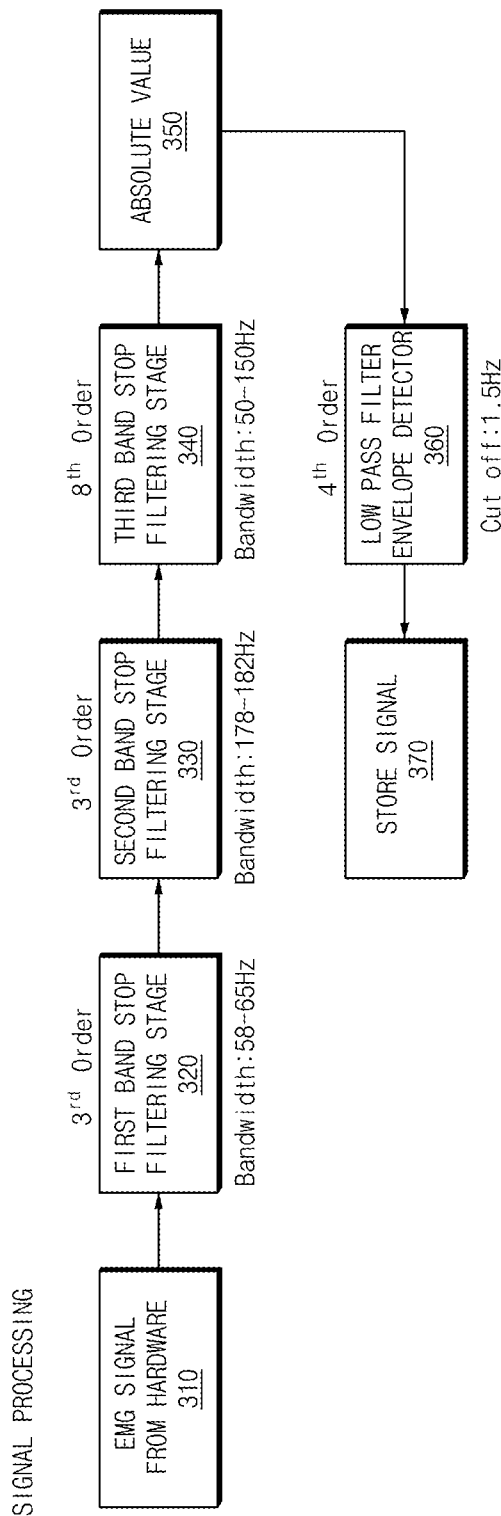
FIG. 4 is a flowchart illustrating a detailed signal processing step of FIG. 3.

FIG. 4 is a flowchart illustrating detailed signal processing step of FIG. 3.

When the EMG signal is received from the EMG signal acquisition system 200 (310), the robot finger control device 100 performs first band stop filtering (320), second band stop filtering (330), and third band stop filtering (340), performs the processing of an absolute value (350), and performs low pass filter envelope detection (360). In the instant case, according to the low pass filter envelope detection, a high-frequency signal may be filtered by an inductor, a low-frequency signal may be filtered by a capacitor, and a signal in a middle band may be obtained through a resistor.

In the instant case, the bandwidth in the first band stop filtering (320) is in the range of 58 Hz to 62 Hz, the bandwidth in the second band stop filtering (330) is in the range of 178 Hz to 182 Hz, and the third band stop filtering 340 is in the range of 50 Hz to 150 Hz. Furthermore, a cut-off frequency may be set to 1.5 Hz in low pass filter envelope detection.

Thereafter, the robot finger control device 100 stores (records) the EMG signal output, as the low pass filter envelope detection is performed (S370). To the present end, the robot finger control device 100 may include a plurality of band stop filters (BSF) and a low pass filter envelope detector for signal processing.

Figure 5:
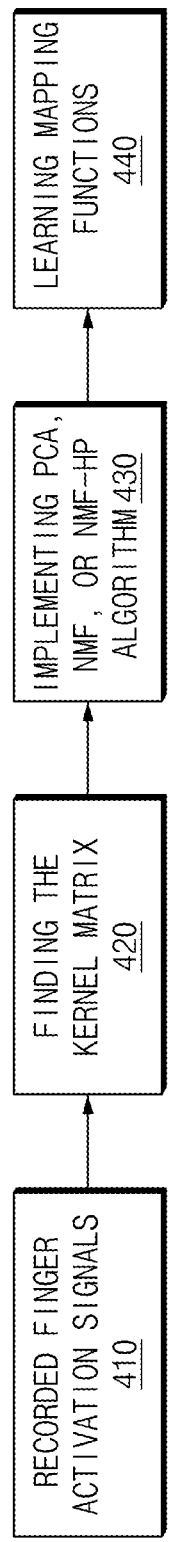
FIG. 5 is a flowchart illustrating a detailed training step of FIG. 3.

FIG. 5 is a flowchart illustrating a training step of FIG. 3 in details.

Referring to FIG. 5, the processor 130 receives the stored finger signal (410) and determines a kernel matrix (420). In the instant case, when a kernel matrix is applied based on signal acquisition device of 8 channels, 36 matrix values may be derived. Accordingly, the processor 130 may obtain a mapping function through the training of the mapping function (440) by applying an algorithm of PCA, NMF, or NMF-HP with respect to 36 matrix values. (430).

Hereinafter, the procedure of training the mapping function through each algorithm will be described with reference to FIG. 6A, FIG. 6B, and FIG. 6C.

Figure 6A:
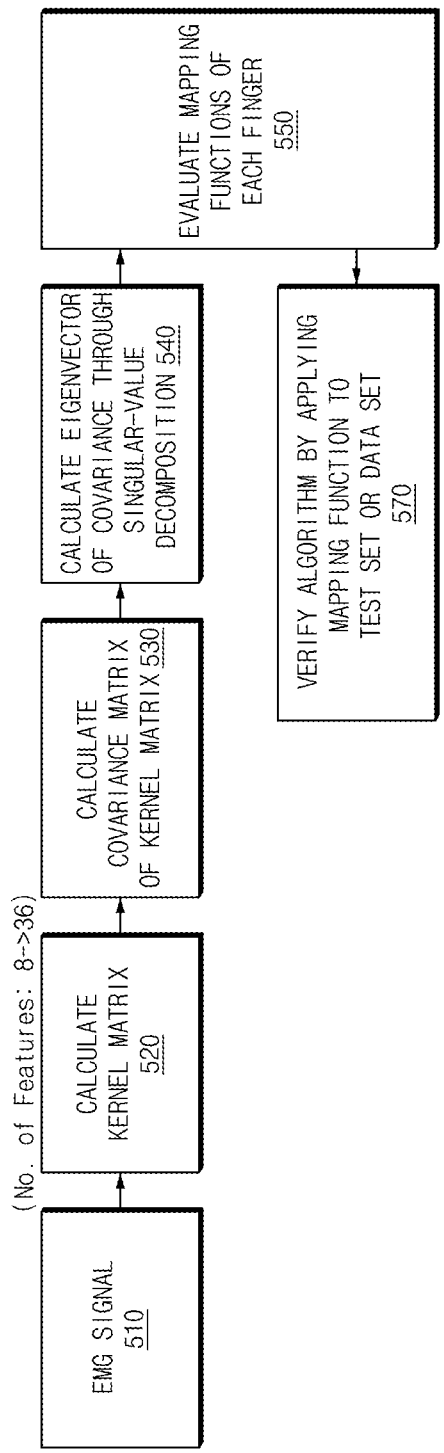
FIG. 6A is a flowchart illustrating a training procedure through a PCA, according to various exemplary embodiments of the present invention.
Figure 6B:
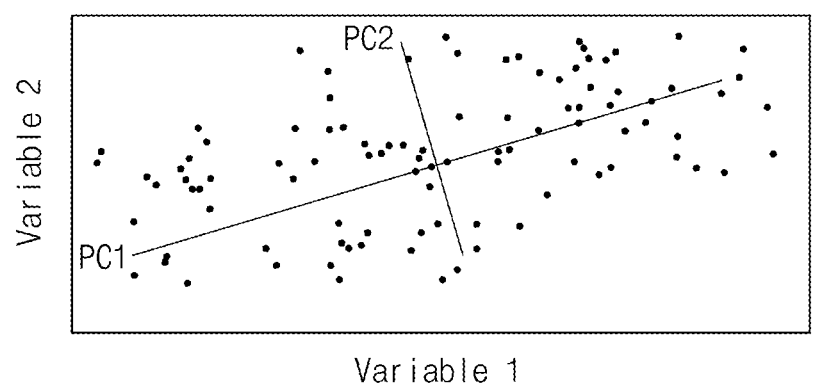
FIG. 6B is a figure depicting how the PCA algorithm provides vectors or Principle Components (PC1 and PC2) based on the variance of the training data, according to various exemplary embodiments of the present invention.

FIG. 6A is a flowchart illustrating a training procedure through a PCA algorithm, according to various exemplary embodiments of the present invention.

Referring to FIG. 6A, the processor 130 of the robot finger control device 100 records (stores) the EMG electrode signal (510).

The following description will be made on the assumption that the EMG electrode signal acquisition device includes 8 channels (A, B, C, D, E, F, G, and H). We let $X \in R^{T \times 8}$ such that 'X' is the matrix describing the values received from eight EMG channels, 'T' denotes the number of time samples, and 'R' denotes a matrix of real numbers. Signals are stored in the sequence of a thumb, an index finger, a middle finger, a ring finger, or a picky. The following description will be made regarding an example of storing a finger movement signal of a thumb and applying the PCA algorithm to the finger movement signal.

The processor 130 determines a kernel matrix (520). The processor 130 determines the kernel matrix using a quadratic polynomial kernel. The processor 130 utilizes a quadratic polynomial function 'V' having 8 variables as illustrated in the following Equation 1.

$$V = (A+B+C+D+E+F+G+H)^2 \quad \text{Equation 1}$$

$$Y = \text{individual terms of } (A+B+C+D+E+F+G+H)^2, Y \in R^{T \times 36} \quad \text{Equation 2}$$

In other words, 'Y' matrix is found when eight dimensions (EMG channels: 'A', 'B', 'C', 'D', 'E', 'F', 'G', and 'H') are increased to 36 dimensions, as the polynomial equation (Equation 1) becomes the kernel matrix 'Y' described in Equation 2.

In the instant case, the kernel matrix may be applied to the eight channels of EMG, and the number of kernels, which are obtained from the individual terms of the quadratic polynomial function 'V', becomes 36.

The processor 130 determines a covariance matrix (Σ) of the kernel matrix as illustrated in following Equation 3 (530).

$$\Sigma = \text{Cov}(Y) \quad \text{Equation 3}$$

In other words, 'Σ' denotes a covariance matrix of the kernel matrix 'Y', and the covariance matrix may be expressed as $\Sigma \in R^{36 \times 36}$.

Thereafter, the processor 130 may obtain an eigenvector matrix, which is illustrated in the following Equation 4, by use of a singular-value decomposition (SVD) algorithm (540).

$$P = \text{Eigenvectors}(\text{Cov}(Y))$$

$$P \in R^{36 \times 36} \quad \text{Equation 4}$$

In the instant case, 'P' denotes a matrix of eigenvectors where each eigenvector possesses a direction which points towards a certain variance of the kernel matrix training data in an order of maximum to minimum values. Thereafter, the processor 130 determines a mapping function (550).

An eigenvector should be selected to maximize the variance of kernel matrix data such that the mapping function for activating an individual finger may be found. Accordingly, the processor 130 the eigenvector, in the direction of the highest variance of the kernel matrix data. As illustrated in the following Equation 5, the mapping matrix or function of the thumb may be found by selecting the first eigenvector in the matrix 'P'.

$$U\_\text{thumb} = P(:,1)$$

$$U\_\text{thumb} \in R^{36 \times 1} \quad \text{Equation 5}$$

Thereafter, the processor 130 determines mapping functions of remaining fingers (560). Equation 5 is an MATLAB based equation. Equation 5 represents that only the first column of the matrix 'P' is selected, and the first column represents the eigenvector in the direction of the highest variance. Accordingly, the sequence of a vector to maximize data variance may include column 1 and column 2 of the matrix 'P', column 1 denotes a vector, which represents the direction of highest variance, of data obtained from the kernel matrix, and the matrix 'P' is an eigenvector matrix. Referring to FIG. 6B as an example, reference numeral 'PC1' denotes an eigenvector representing the direction of the maximum variance of data obtained from the kernel matrix, and 'PC2' denotes an eigenvector representing the direction of the second maximum variance.

The processor 130 may determine mapping functions (U_index, U_middle, U_ring, and U_pinkie) of remaining fingers by repeating operations 510 to 570.

The processor 130 identifies an algorithm by applying a mapping function to a test set or a data set (570).

In other words, the processor 130 may identify the data set or test set (if available) using the following matrix multiplication for each individual finger. For example, a thumb mapping matrix may be used and may be expressed as Following Equation 6 below.

$$Z\_\text{thumb} = V \times U\_\text{thumb} \quad \text{Equation 6}$$

In the instant case, V denotes a function of Equation 1.

Figure 6C:
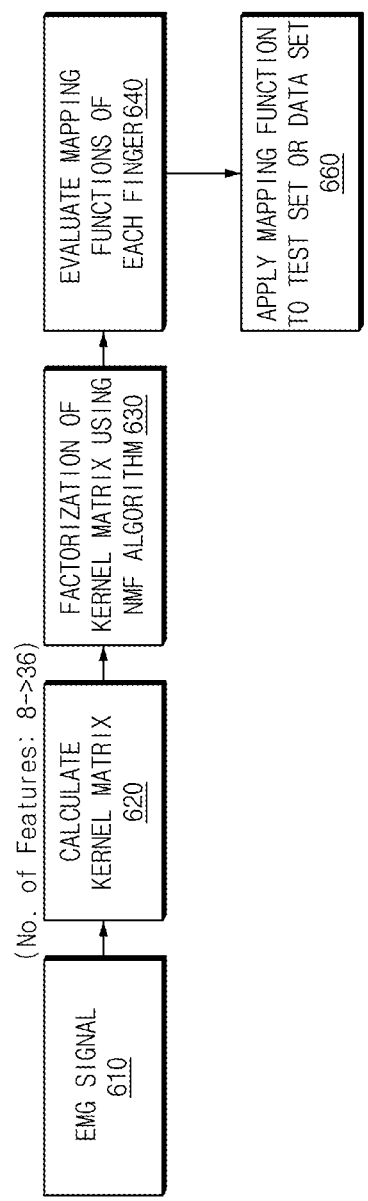
FIG. 6C is a flowchart illustrating a training procedure through a PCA and NMF algorithm according to various exemplary embodiments of the present invention.

FIG. 6C is a flowchart illustrating a learning process based on the NMF algorithm, according to various exemplary embodiments of the present invention.

The processor 130 determines a kernel matrix (620) after the EMG signal is recorded (610), which is similar to the PCA algorithm. The kernel matrix is illustrated in Equation 2 described above.

Subsequently, the processor 130 determines a factorized matrix based on the NMF algorithm (630).

The matrix is decomposed by V=WH, and the size of the matrix may be selected as $W \in R^{T \times 1}$ and $H \in R^{1 \times 36}$ The processor 130 determines a mapping function using the matrix H in the next step. When using the NMF algorithm, the processor 130 may determine the matrix W and the matrix H using a multiplicative update formula as illustrated in Equation 7.

$$H(n+1) \to \frac{H(W^T V)}{(W^T W H)} \quad \text{Equation 7}$$

$$W(n+1) \to \frac{(V H^T)}{(W H H^T)}$$

Subsequently, the processor 130 performs a mapping function calculation (640).

To determine the mapping function for individual fingers using the NMF algorithm, the matrix H found in the previous step should be determined. Therefore, the mapping matrix of the thumb may be obtained as in Equation 8.

$$U\_\text{thumb} \in R^{36 \times 1}$$

$$U\_\text{thumb} = H^+ \quad \text{Equation 8}$$

In the instant case, H+ is a Moore-Penrose pseudoinverse of matrix H.

Thereafter, the processor 130 determines a mapping function of the remaining fingers (650).

Subsequently, the processor 130 may also determine the mapping functions (U_index, U_middle, U_ring, and U_pinkie) of the remaining fingers by repeating operations 610 to 650.

In the instant case, the procedure of determining the mapping function by performing operations 610 to 650 corresponds to the training step of FIG. 3. The mapping function determined in such a manner is stored as values of mapping coefficients of FIG. 7B.

The processor 130 may output a final finger signal by applying a mapping function to the test set or the data set as illustrated in following Equation 9 (660).

$$Z\_\text{thumb} = Y \times U\_\text{thumb} \quad \text{Equation 9}$$

In the instant case, 'Z thumb' denotes an output signal to move a thumb, 'Y' denotes a kernel matrix value, and 'U thumb' denotes a mapping function.

As described above, although FIG. 6A, FIG. 6B, and FIG. 6C include only examples in which a PCA algorithm and an NMF algorithm are applied to the kernel matrix, the NMF-HP algorithm can also be applied to the kernel matrix to obtain an output value.

Figure 7A:
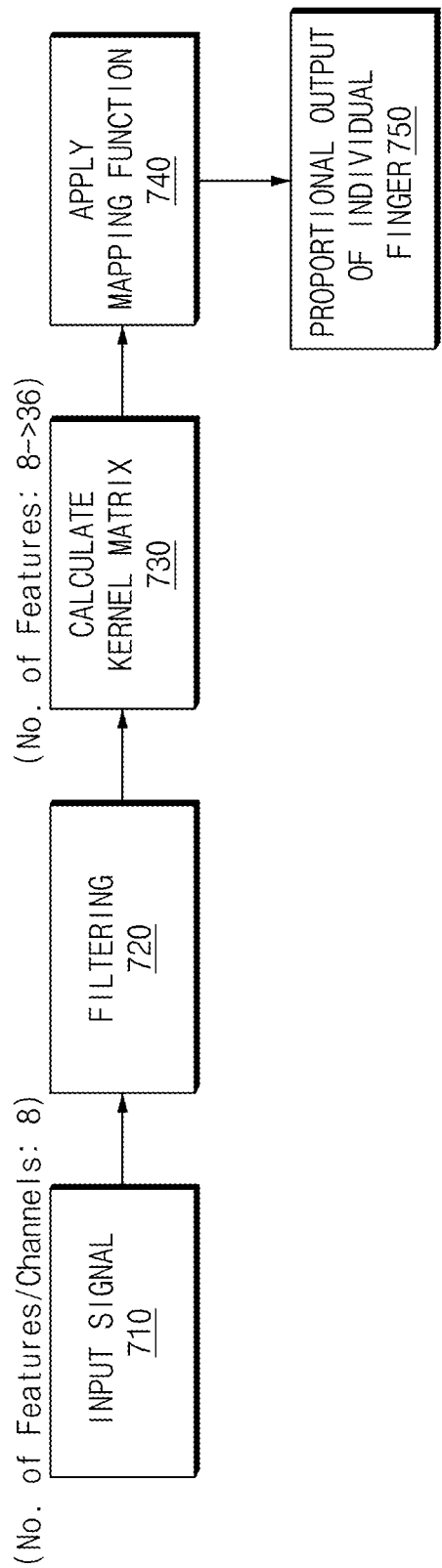
FIG. 7A is a flowchart illustrating a detailed step of controlling an individual finger of FIG. 3.
Figure 7B:
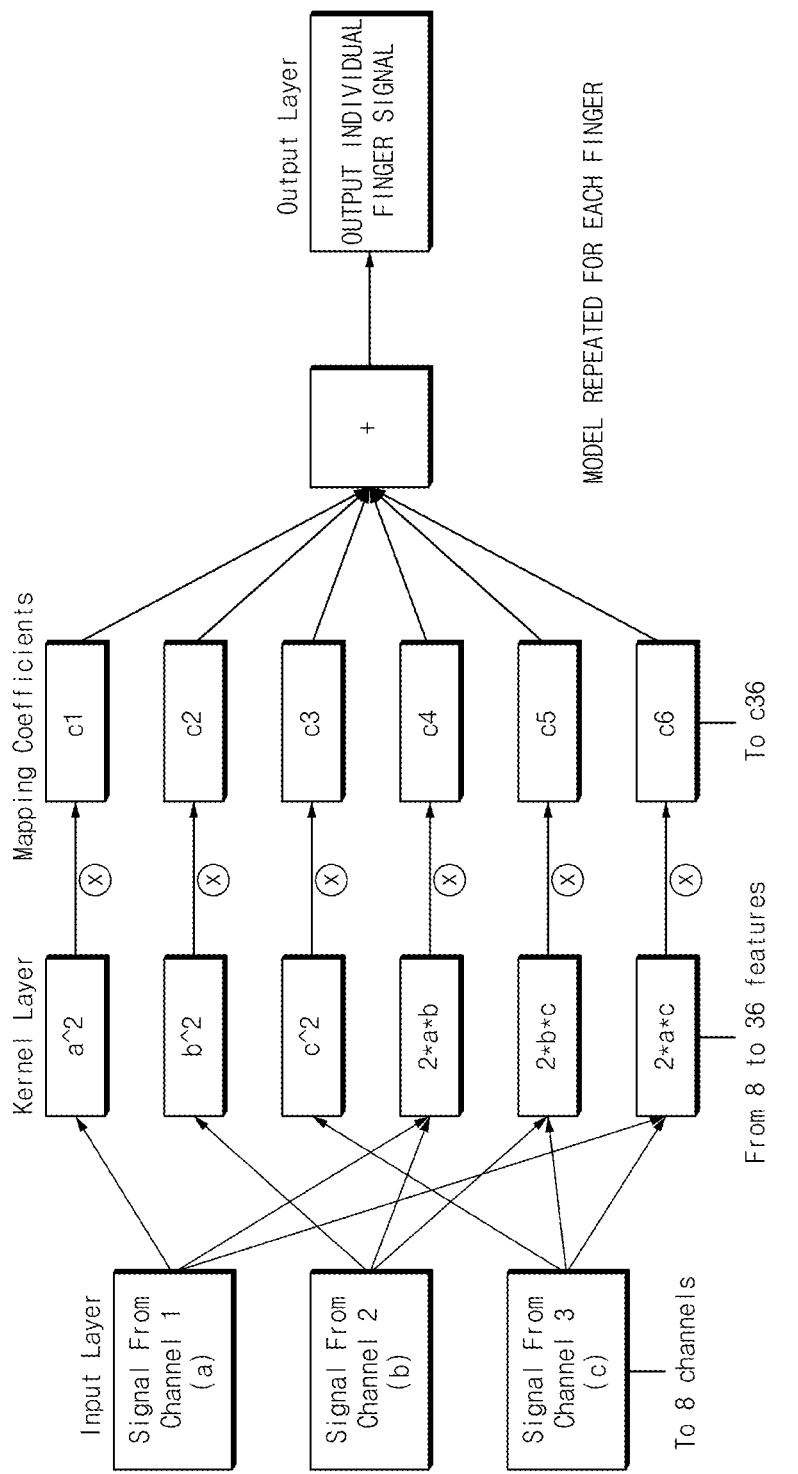
FIG. 7B is a view exemplarily illustrating the procedure of acquiring signal output from an individual finger by applying a kernel matrix and a mapping function of FIG. 7A.

FIG. 7A is a flowchart illustrating the detailed steps of controlling an individual finger of FIG. 3, and FIG. 7B is a illustrates the procedure of outputting an individual finger signal by applying the kernel matrix and the mapping function of FIG. 7A.

When the EMG electrode signal is input (710), the processor 130 performs filtering (720) and then determines the kernel matrix (730). For example, when an EMG electrode signal of the eight channels or dimensions, which is input, is increased to 36 dimensions by determining a kernel matrix.

Subsequently, the processor 130 applies a mapping function to each kernel matrix value having the increased dimensions (740). In other words, the processor 130 multiplies the mapping function to each kernel matrix value having the increased dimensions.

The processor 130 determines the sum of values to which the mapping functions are applied and outputs the sum as one individual finger signal.

FIG. 8A, FIG. 8B, FIG. 8C, and FIG. 8D are graphs illustrating outputs of the robot fingers, according to various exemplary embodiments of the present invention.

Figure 8A:
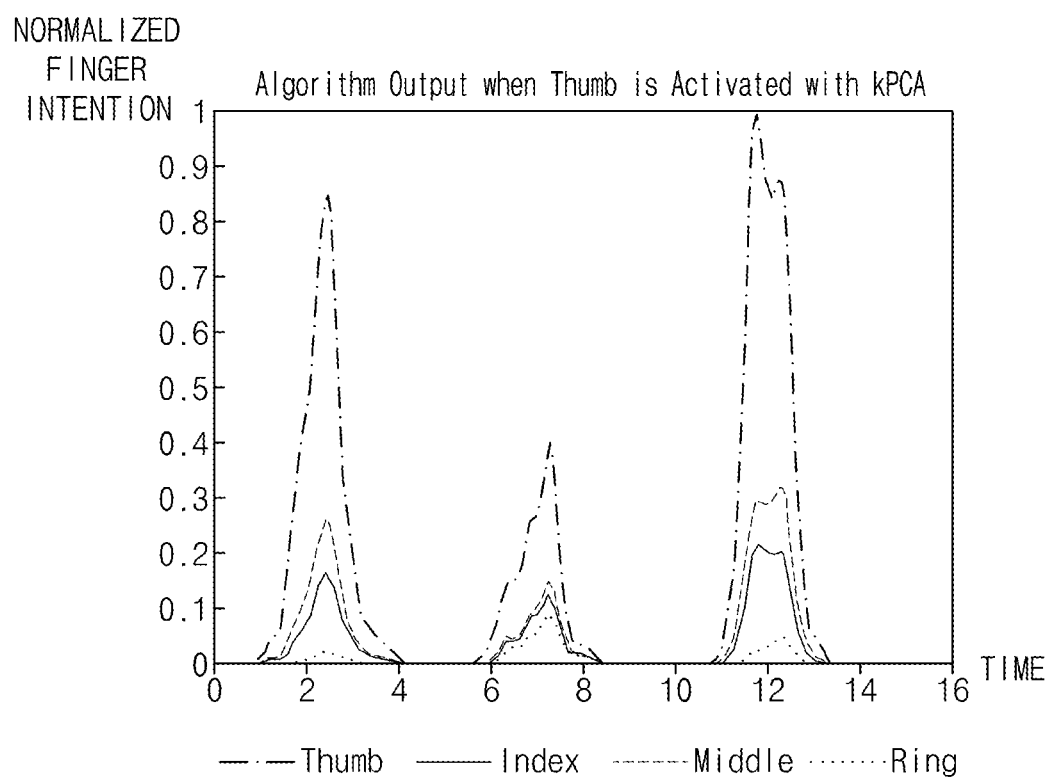
FIG. 8A, FIG. 8B, FIG. 8C, and FIG. 8D are graphs illustrating outputs to the robot finger, according to various exemplary embodiments of the present invention.
Figure 8B:
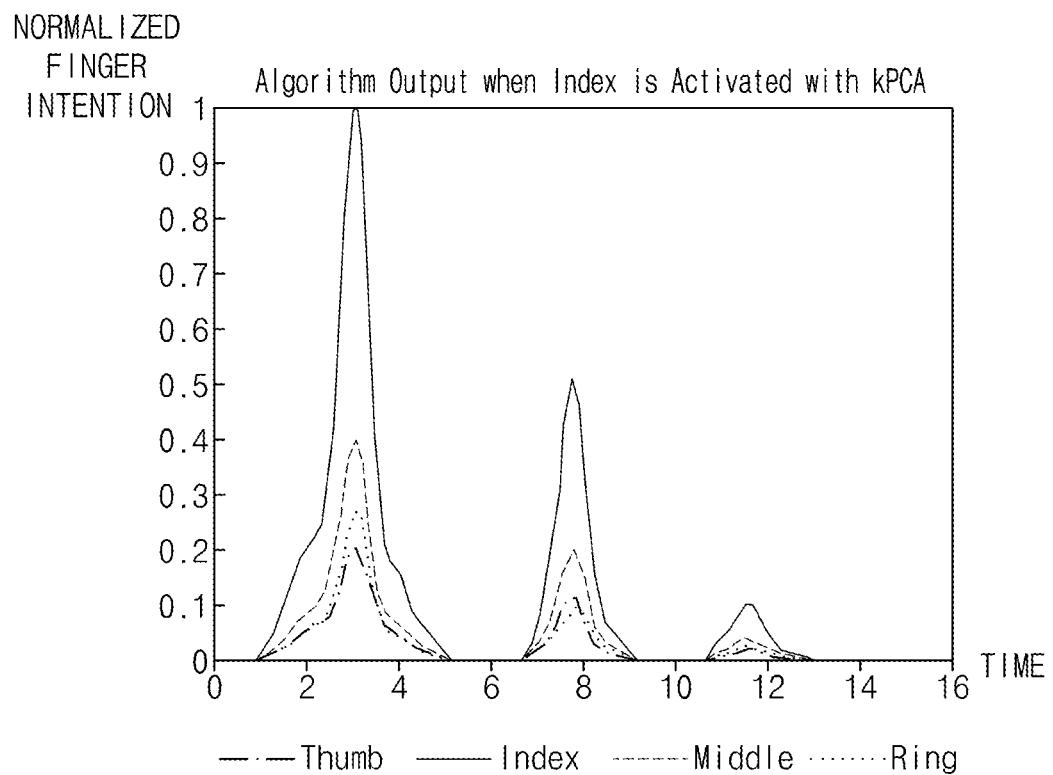
Figure 8C:
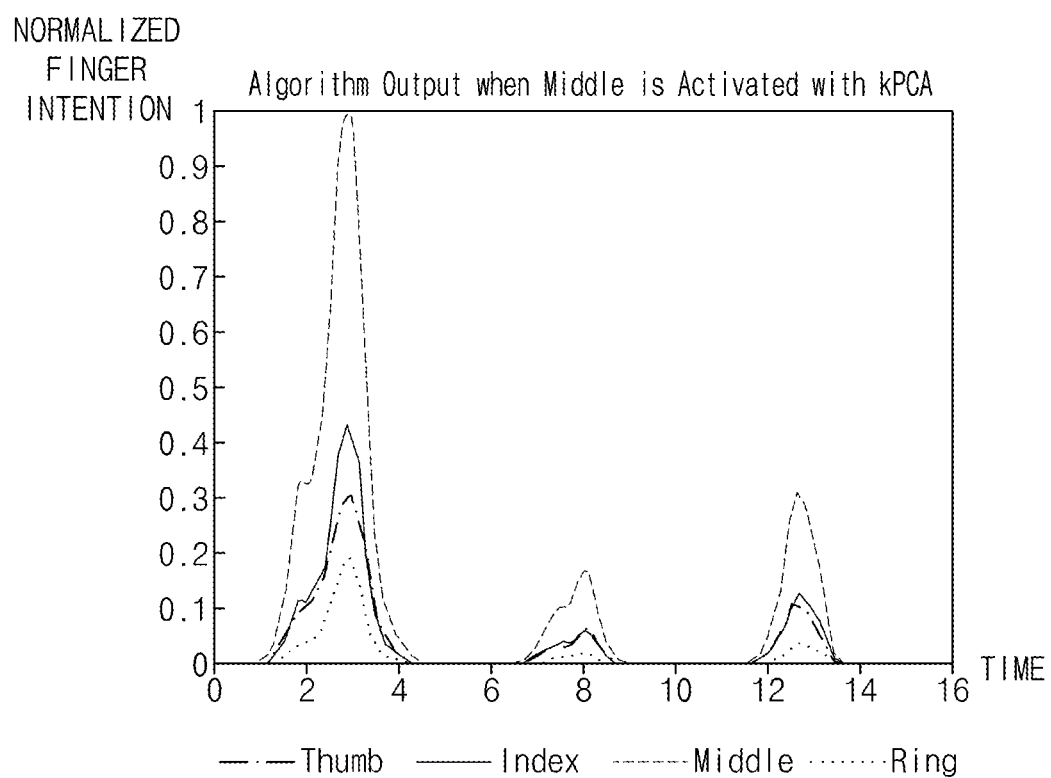
Figure 8D:
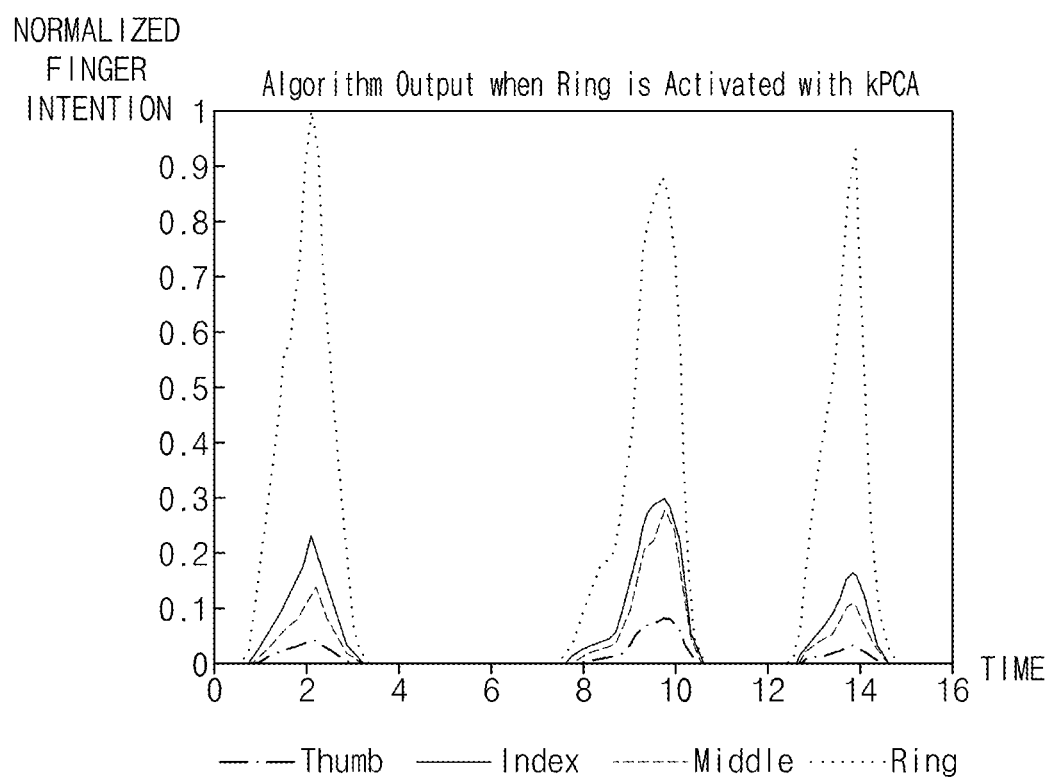

It may be recognized from FIG. 8A that an output signal of a thumb is greater than the output signals of remaining fingers in intensity, when a user intends to move the thumb. It may be be seen from FIG. 8B, 8C, or 8D that output signals of the index finger, the middle finger, or the ring finger are greater than output signals of remaining fingers other than the relevant finger in intensity, when the user intends to move the relevant finger.

Figure 9:
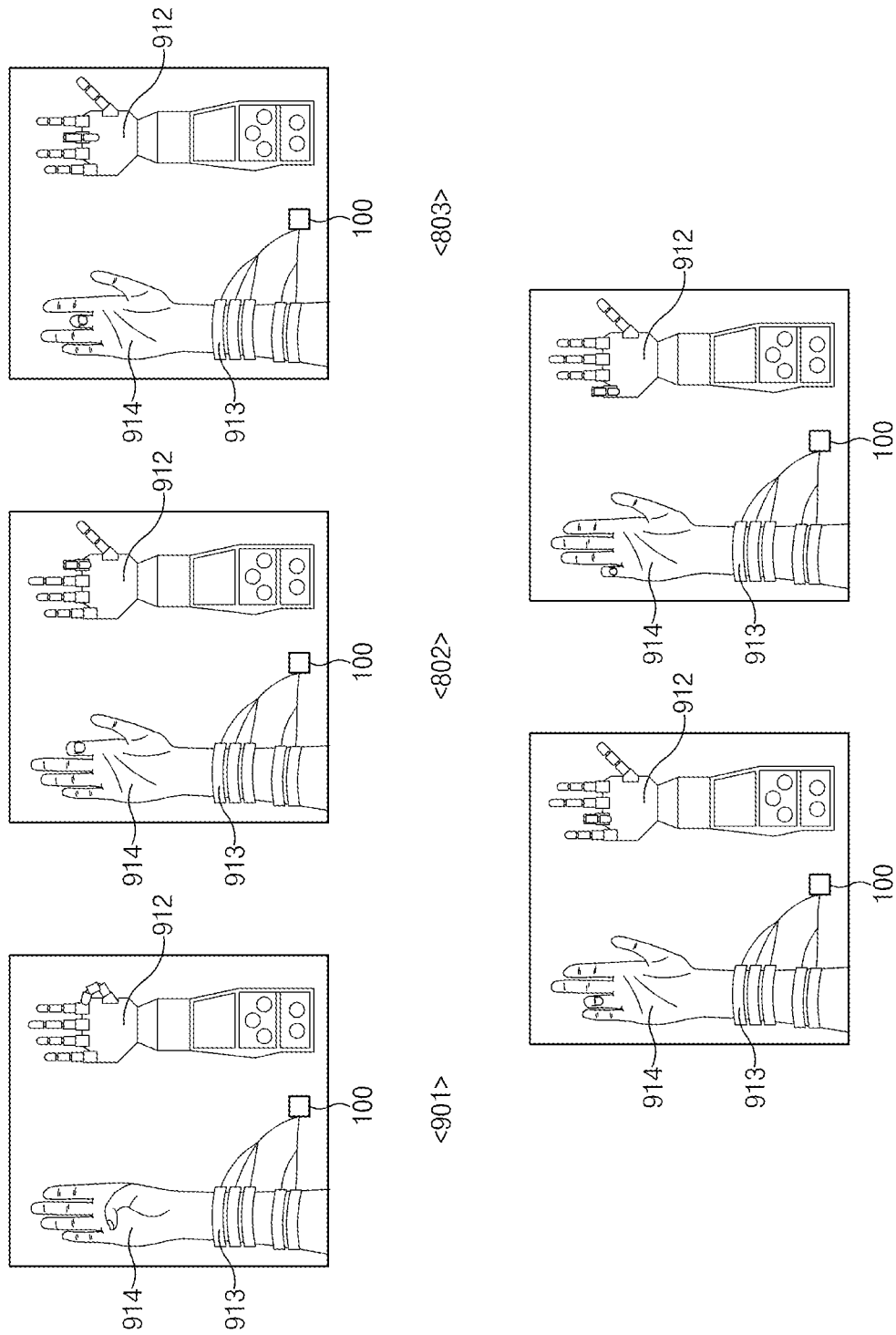
FIG. 9 is a view illustrates the control of each robot finger, according to various exemplary embodiments of the present invention.

FIG. 9 is a view exemplarily illustrating a screen of controlling a robot finger, according to various exemplary embodiments of the present invention.

Referring to FIG. 9, the movement of a finger 911 of a user is detected based on the EMG signal from the EMG sensors 913, as the finger of the user moves. Accordingly, the robot hand 912 may be controlled to be moved similarly to the real hand of the user.

Reference numeral 901 of FIG. 9 illustrates an example in which only the thumb of the robot finger is activated, when the user activates only the thumb. Reference numerals 902, 903, 904, and 905 illustrate the index finger, the middle finger, the ring finger, and the pinky, respectively.

As described above, according to various exemplary embodiments of the present invention, the structure of algorithm implementation includes input EMG signals from multiple channels, the kernel matrix which is obtained from a second order polynomial function, a mapping function, which is trained through a learning algorithm and outputs the control signal for the robotic finger.

Accordingly, instead of individually inputting EMG signals of a plurality of channels, the number input signal dimensions can be increased using the kernel matrix and the mapping function is applied to the result, increasing the accuracy of the output signal of the finger.

Figure 10:
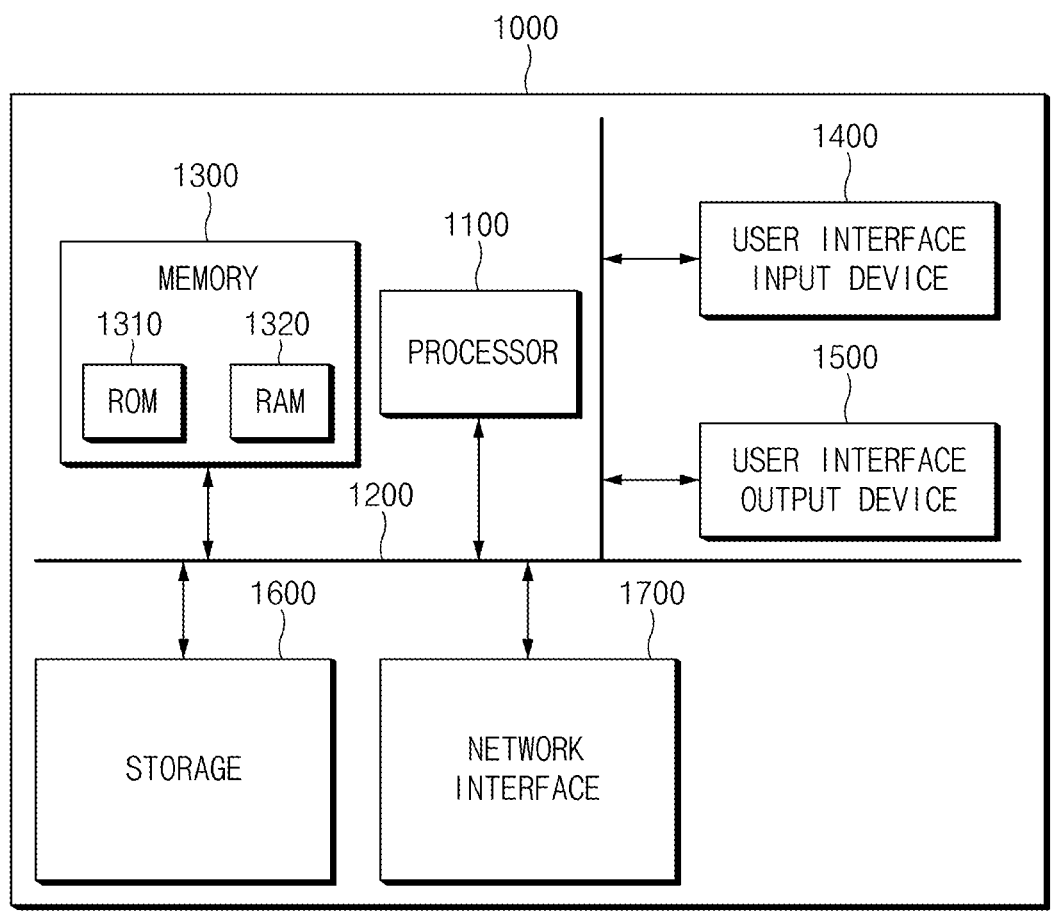
FIG. 10 illustrates a computing system, according to various exemplary embodiments of the present invention.

FIG. 10 illustrates a computing system, according to various exemplary embodiments of the present invention.

Referring to FIG. 10, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device configured for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the exemplary embodiments included in various exemplary embodiments of the present invention may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to various exemplary embodiments of the present invention, the mapping function found using a kernel matrix using an unsupervised learning algorithm may be determined and the user intention to move the finger may be exactly detected when controlling the robot finger.

According to various exemplary embodiments of the present invention, an unsupervised learning algorithm is used instead of a supervised learning algorithm to perform simultaneous and proportional control without output proportional values. A supervised learning algorithm performs simultaneous and proportional control using output proportional values through the additional force (pressure) sensors. Accordingly, the additional hardware is not required in the present disclosure, and thus, the costs may be reduced.

Therefore, according to the present technology, the intention of the patient, who has no hand to interact with external sensors using his or her fingers, may be estimated to control the robot finger.

Besides, a variety of effects directly or indirectly understood through the present invention may be provided.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for controlling a robot finger, the system comprising:
a processor configured to determine a mapping function using a kernel matrix by a multichannel electromyographic (EMG) signal to train a learning algorithm through at least one EMG signal training sample; and
a storage configured to store data and an algorithm driven by the processor,
wherein the processor is configured to:
determine the kernel matrix by applying a polynomial function to the at least one EMG signal training sample;
perform an operation for the kernel matrix and the mapping function to output a signal and control the robot finger using the signal;
evaluate the kernel matrix by determining individual terms of a second order polynomial function using the multichannel EMG signal; and
determine a covariance matrix of kernel matrix value, and
wherein the processor is further configured to:
calculate the kernel matrix value by calculating a sum of the at least one EMG signal and calculating a square of the sum.

2. The system of claim 1,
wherein the polynomial function is a quadratic polynomial function, and
wherein the processor is configured to determine the kernel matrix by use of the quadratic polynomial function.

3. The system of claim 1, wherein the processor is configured to determine eigenvectors of the covariance matrix.

4. The system of claim 3, wherein the processor is configured to determine the mapping function by use of the eigenvectors.

5. The system of claim 1, wherein the processor is configured to:
determine the kernel matrix;
multiply the mapping function by the kernel matrix value to generate a multiplied value; and
determine a sum of the multiplied value to output the signal for controlling the robot finger, when at least one EMG signal time sample is input.

6. The system of claim 1, wherein the processor is configured to determine a mapping function for each finger.

7. The system of claim 1, wherein the learning algorithm includes a semi-unsupervised algorithm.

8. The system of claim 7, wherein the semi-unsupervised algorithm includes:
a principle component analysis (PCA) algorithm, a non-negative matrix factorization (NMF) algorithm, or a NMF with hadamard product (NMF-HP) algorithm.

9. The system of claim 1, wherein the processor is configured to determine a factorization-based matrix, after determining the kernel matrix value.

10. The system of claim 9, wherein the mapping function is determined by applying a multiplication update formula to the factorization-based matrix.

11. The system of claim 1, further including:
an EMG signal acquisition device configured to output the EMG signal,
wherein the EMG signal acquisition device includes:
at least one EMG channel configured to measure a voltage signal emanating from muscles of a body of a user;
an amplifier configured to amplify the EMG signal received from EMG electrodes;
a filter configured to filter the EMG signal amplified in the amplifier; and
a gain device configured to provide a gain to a filtered EMG signal.

12. A method for controlling a robot finger, the method comprising:
determining and storing a mapping function based on a kernel matrix by applying multichannel EMG signal training sample, which is previously stored, to train a learning algorithm;
determining the kernel matrix by applying a quadratic polynomial function to the multichannel EMG signal, when multichannel EMG signal time sample is input; and
performing an operation for the kernel matrix and the mapping function to output a signal for and controlling the robot finger using the signal,
wherein the determining and the storing of the mapping function includes:
determining the kernel matrix by determining individual terms of a second order polynomial function using a multichannel EMG signal; and
determining a covariance matrix of kernel matrix value, and
wherein the determining the kernel matrix includes:
calculating the kernel matrix value by calculating a sum of the at least one EMG signal and calculating a square of the sum.

13. The method of claim 12, wherein the learning algorithm includes a principle component analysis (PCA) algorithm, a non-negative matrix factorization (NMF) algorithm, or a NMF with hadamard product (NMF-HP) algorithm.

14. The method of claim 12, wherein the determining and the storing of the mapping function further include:
determining an eigenvector of the covariance matrix.

15. The method of claim 14, wherein the determining and the storing of the mapping function further include:
determining the mapping function by use of an eigenvector matrix.

16. The method of claim 12, wherein the outputting of the signal for controlling the robot finger includes:
multiplying the mapping function by the kernel matrix to generate a multiplied value; and
determining a sum of the multiplied value to output the signal for controlling the robot finger.

* * * * *